United States Patent [19]

Sturgis et al.

[11] 4,174,731
[45] Nov. 20, 1979

[54] EXCESS FLOW LIMITING VALVE

[75] Inventors: Malcolm B. Sturgis, St. Louis, Mo.; Harry H. Hammond, North Royalton, Ohio

[73] Assignee: The Hansen Manufacturing Company, Cleveland, Ohio

[21] Appl. No.: 853,194

[22] Filed: Nov. 21, 1977

[51] Int. Cl.² ............................................. F16K 17/26
[52] U.S. Cl. .................... 137/489; 137/504; 137/513.3; 137/543.15; 29/157.1 R
[58] Field of Search ............... 137/513.3, 513.5, 513.7, 137/543.15, 498, 504, 460, 533.17; 251/149.1–149.8

[56] References Cited

U.S. PATENT DOCUMENTS

| 501,437 | 7/1893 | Pierce | 137/513.3 |
|---|---|---|---|
| 824,425 | 6/1906 | Johnson . | |
| 852,007 | 4/1907 | Wilson | 137/513.3 X |
| 920,716 | 4/1909 | Beckman | 137/513.3 |
| 1,410,218 | 3/1922 | Palmer . | |
| 2,121,936 | 6/1938 | Thomas . | |
| 2,245,271 | 6/1941 | Guill . | |
| 2,411,392 | 11/1946 | Saville . | |
| 2,668,555 | 2/1954 | Bartolat . | |
| 2,673,568 | 3/1954 | Buffington . | |
| 2,781,775 | 2/1957 | Merrill . | |
| 3,122,162 | 2/1964 | Sands . | |
| 3,334,659 | 8/1967 | Magorien | 251/149.6 X |
| 3,352,531 | 11/1967 | Kilmarx | 251/149.6 |
| 3,561,472 | 2/1971 | Lamb et al. | 137/513.3 |
| 3,572,845 | 3/1971 | Johannesen | 137/498 X |
| 3,683,957 | 8/1972 | Sands | 137/498 X |
| 3,718,312 | 2/1973 | Payne | 251/149.6 X |
| 3,729,023 | 4/1973 | Hammond . | |
| 3,756,272 | 9/1973 | Hammond . | |
| 3,812,542 | 5/1974 | Shiley | 137/533.27 X |
| 3,872,884 | 3/1975 | Busdiecker et al. . | |
| 3,918,492 | 11/1975 | Karcher et al. . | |
| 3,974,852 | 8/1976 | Svensson | 137/498 |

Primary Examiner—William R. Cline

[57] ABSTRACT

A conduit coupling includes an improved plug assembly. The plug assembly has a valve which limits excess flow in the direction of normal flow and prevents backflow in the opposite direction. The valve includes a valve member which is operated from a first closed condition to an open condition in response to a pressure differential caused by normal flow. The valve member further moves to a second closed condition in response to a predetermined pressure differential across the valve member which would result in an excess flow in the downstream direction. The valve member operates from its open condition to the first closed condition whenever the difference between the upstream pressure and the downstream pressure is less than a predetermined amount, thus preventing backflow. A leak down passage is provided which allows fluid to flow through the valve assembly even when the valve is closed. This enables the valve member to return to its normal open position after there has been an excessive fluid flow by allowing fluid to flow from a high pressure side to a low pressure side of the valve member to reduce the pressure differential.

7 Claims, 7 Drawing Figures

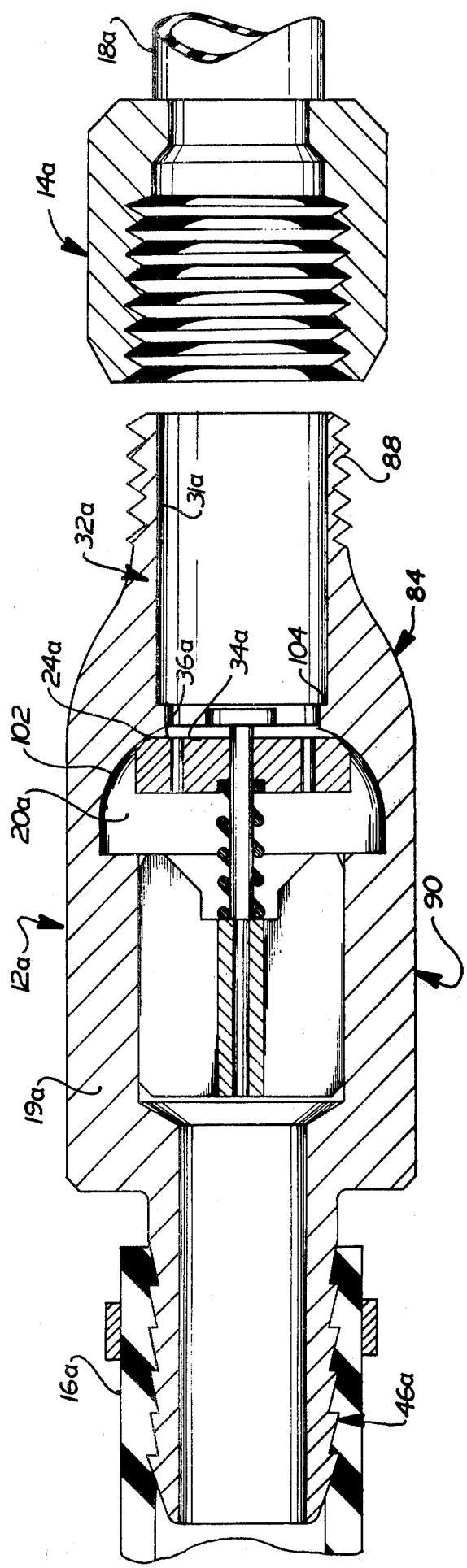
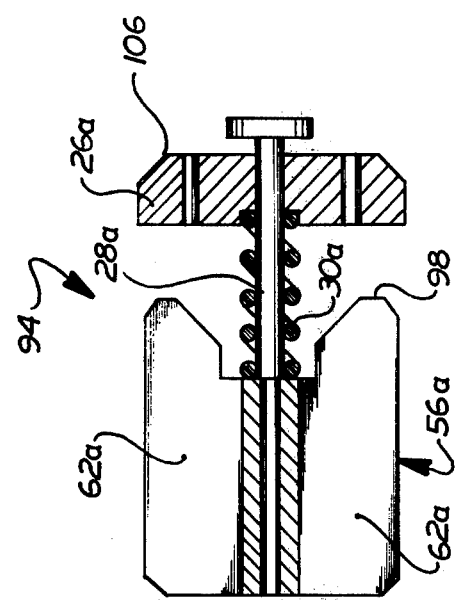
FIG.6
FIG.7

EXCESS FLOW LIMITING VALVE

BACKGROUND OF THE INVENTION

The present invention relates generally to an improved plug assembly and more particularly to a plug assembly that combines the dual functions of minimizing excessive fluid flows and backflows.

During the use of pneumatically actuated equipment, a rupture of the fluid conduit or a malfunction of associated equipment can result in an excessive fluid flow through the conduit. In addition to being wasteful, this excessive fluid flow can be dangerous to operating personnel who happen to be in the area. There are known devices for restricting the flow in the event of excessive pressure differentials across the device. Some of these are disclosed in U.S. Pat. Nos. 3,918,492; 3,756,272; and 3,729,023.

In fluid system it is frequently necessary to prevent backflow through the system. Such a need arises when a conduit filled with fluid under pressure is disconnected from the pressure source. This can cause a rapid and dangerous discharge of fluid as the conduit empties. In addition if the conduit is flexible, the discharge may cause dangerous motion of the conduit.

Separate check valves and flow limiting valves have been provided. However, it is believed that they do not represent the best combination of low cost construction, ease of assembly, and desirable operating characteristics. Various known valve arrangements are disclosed in U.S. Pat. Nos. 3,872,884; 3,122,162; 2,673,568; 2,411,392; 2,245,271 and 824,425.

SUMMARY OF THE PRESENT INVENTION

The present invention provides a new and improved plug assembly which is capable of preventing excessive fluid flow and backflows. During normal operation, demand for fluid flow causes the fluid pressure at the inlet or upstream side of the plug assembly to force a valve member from a first closed position to an open position against the influence of a biasing spring. The fluid then flows freely through the plug assembly. Upon the occurrence of an excessively large pressure differential across the plug assembly and the resulting initiation of excessive fluid flow, the valve member is urged against the force of the biasing spring to a second closed position in abutting engagement with an outlet valve seat.

When the valve member is in the second closed position, it blocks substantially all flow through the plug assembly, and the only fluid flow is through leakdown passages in the valve member. The leakdown passages are provided so that once the cause of the excess flow has been eliminated, the pressure differential across the closed plug assembly will drop. The valve member can then move back to its first closed position under the influence of the biasing spring.

In the event that pressure on the downstream side of the valve member should increase or the pressure on the upstream side should decrease, the valve member will be urged against an inlet valve seat by a backflow pressure in cooperation with the biasing spring.

The continuing motion of the valve member in response to demand for fluid performs a self cleansing action to keep the valve member movable even when the fluid supply contains contaminants.

Accordingly, it is an object of this invention to provide a new and improved plug assembly having a valve member which cooperates with a pair of valve seats to block excessive fluid flow through the plug assembly and to block backflow of fluid through the plug assembly.

Another object of this invention is to provide a new and improved plug assembly as set forth in the next preceding object and wherein the valve member is slidably supported on a longitudinally extending support member for movement between an open position intermediate the two valve seats and either one of the two closed positions.

It is a further object of this invention to provide a new and improved plug assembly as set forth in any one of the preceding objects and wherein the valve member has leakddown passageways located so that fluid may flow through the passageways regardless of which seat the valve member is closed against.

In addition, it is an object of this invention to provide a new and improved plug assembly as set forth in any one of the preceding objects and wherein the valve member is supported on a longitudinally extending support member and biased toward one of the valve seats by a coil spring surrounding the support member.

In addition it is an object of this invention to provide a new and improved plug assembly as set forth in any one of the preceeding objects and wherein the plug assembly cleans itself by the continuous motion of the valve member between its two positions cooperating with two valve seats.

BRIEF DESCRIPTION OF THE DRAWINGS

The foregoing and other objects and features of the present invention will become more apparent upon a consideration of the following description taken in connection with the accompanying drawings wherein:

FIG. 6 is a partially broken away illustration of a conduit coupling having a plug assembly constructed in accordance with a second embodiment of the present invention, the coupling being shown in a disconnected condition.

FIG. 7 is a sectional view of the plug assembly of FIG. 6 prior to assembly showing the housing and a subassembly including the valve member mounted with a spring on a support rod and base.

DESCRIPTION OF ONE SPECIFIC PREFERRED EMBODIMENT OF THE INVENTION

Figure 1:
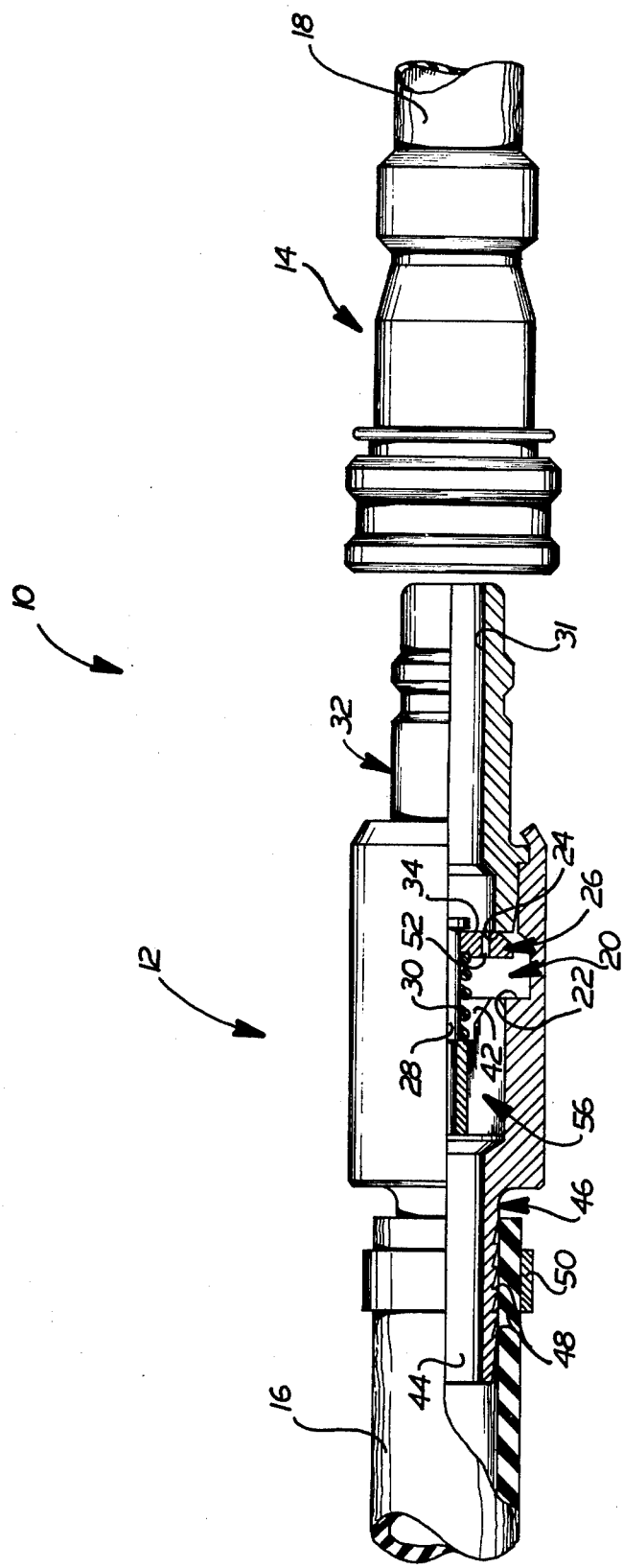
FIG. 1 is a partially broken away illustration of a quick-connect coupling having a plug assembly constructed in accordance with the present invention, the coupling being shown in a disconnected condition.

A quick-connect coupling assembly 10 includes an improved plug assembly 12 (FIG. 1). The plug assembly 12 is telescopically received in a socket assembly 14 to connect a conduit 16 in fluid communication with a conduit 18. The general manner in which the plug and socket assemblies 12 and 14 are interconnected when the plug assembly is inserted in the socket assembly is the same as that disclosed in U.S. Pat. Nos. 3,729,203 and 3,918,492.

In accordance with a feature of the present invention, the plug assembly 12 performs the dual functions of minimizing both excessive downstream fluid flow and backflow in an upstream direction. Thus, in the event of a rupture of the downstream conduit 16, or a surge in the upstream pressure conducted to the socket 14, the plug assembly 12 operates to limit the flow. This prevents excessive fluid flow through the conduits 16 and 18 in a downstream direction. On the other hand, undersirable flow in the upstream direction is caused when the downstream pressure exceeds the upstream pressure. This happens when the plug assembly 12 is disconnected from the socket 14 or there is a sudden loss of upstream pressure. In such an event the plug assembly 12 operates to limit the upstream backflow.

The plug assembly 12 (FIG. 2) includes a generally cylindrical housing 19 in which a valve chamber 20 is located. The valve chamber 20 has a relatively large cylindrical main section 21 with two coaxial annular valve seats 22 and 24. A circular disc shaped valve member 26 is disposed in the main section of the valve chamber 20 in a coaxial relationship with the valve seats 22 and 24.

Figure 2:
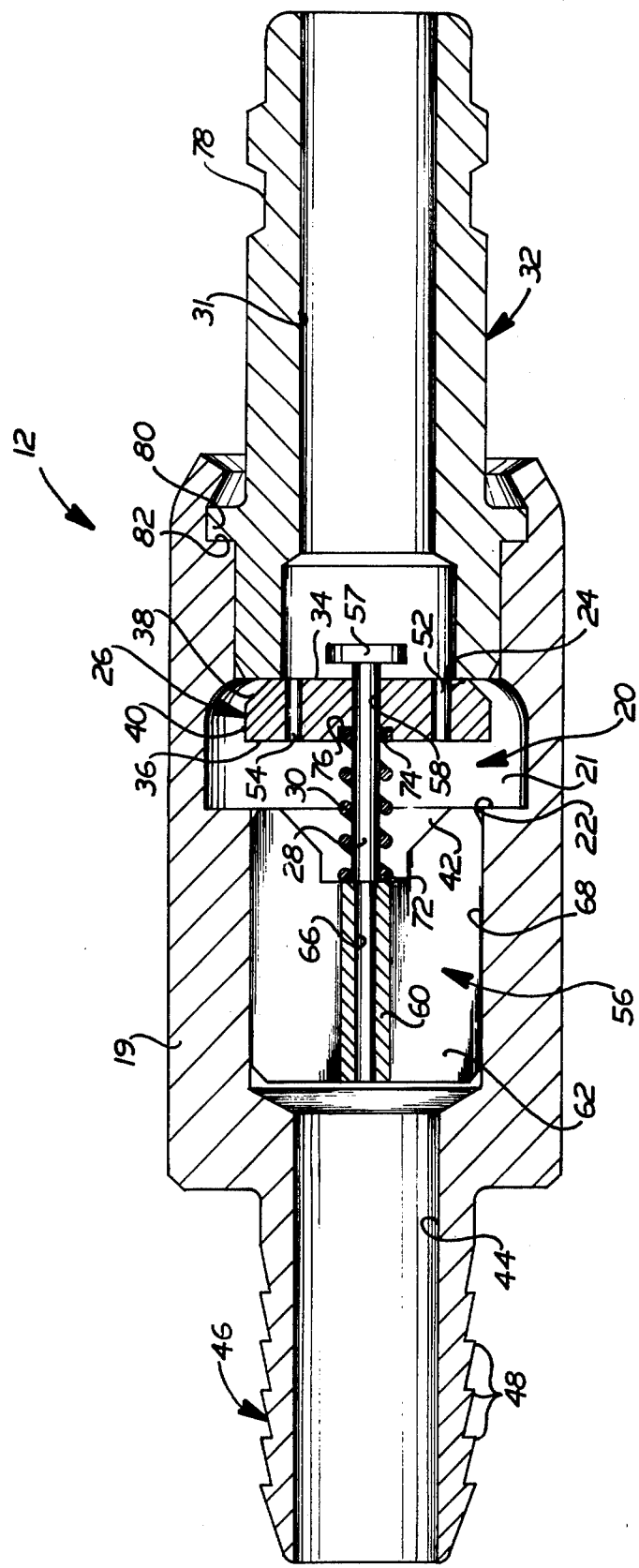
FIG. 2 is an enlarged sectional view of the plug assembly of FIG. 1 showing a valve member closed against an inlet valve seat so as to block backflow through the plug assembly.
Figure 3:
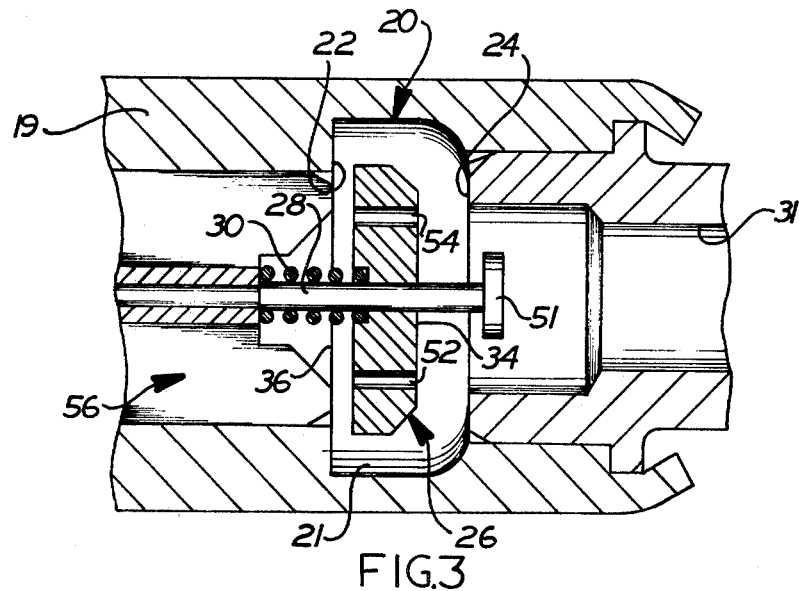
FIG. 3 is a sectional view of a portion of the plug assembly showing the valve member of FIG. 2 in an open position enabling fluid to flow freely through the plug assembly.
Figure 4:
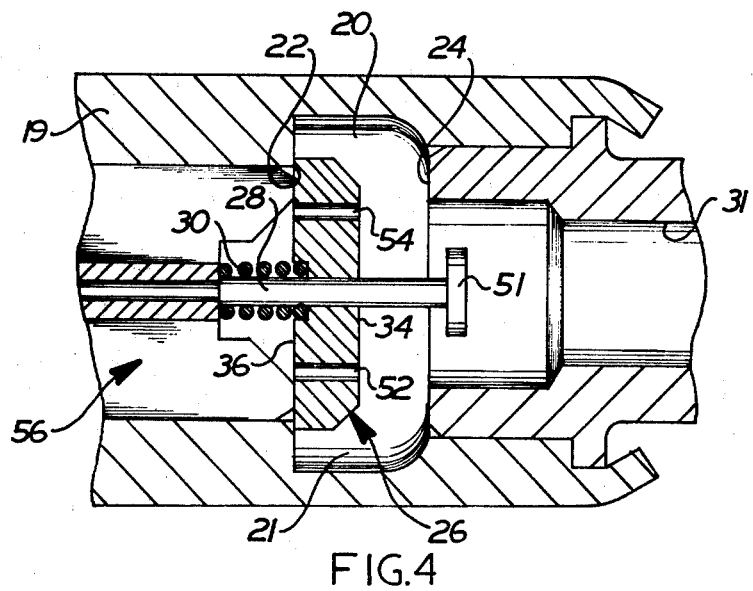
FIG. 4 is a sectional view of a portion of the plug assembly showing the valve member of FIG. 2 closed against an outlet valve seat so as to block excessive fluid flow through the plug assembly.

The valve member 26 is movable axially along a support member 28 between a first closed position (FIG. 2), an open position (FIG. 3), and a second closed position (FIG. 4). When the valve member 26 is in the first closed position, it is disposed in flat abutting engagement with valve seat 24 to substantially block fluid flow through the valve chamber 20 (FIG. 2). When the valve member 26 is in the open or intermediate position, it is spaced apart from the two valve seats 22 and 24 so that fluid can flow through the valve chamber 20 around the valve member (FIG. 3). When the valve member 26 is in the second closed position, it is disposed against the downstream or outlet valve seat 22 and is again effective to substantially block fluid flow through the valve chamber 20 (FIG. 4). The valve member 26 is continuously urged from the second closed position of FIG. 4 toward the open position of FIG. 3 and from the open position of FIG. 3 toward the closed position of FIG. 2 under the influence of a biasing spring 30.

When the coupling 10 is connected, normal fluid flow is from the conduit 18 (see FIG. 1) through the socket 14 and into a cylindrical passage 31 defined by an interior surface of the leading end or nose portion 32 of the plug assembly 12. The fluid pressure in the passage 31 is applied against an upstream circular major side surface 34 (FIG. 2) of the valve member 26. When the fluid pressure on surface 34 slightly exceeds the combined force of the bias spring 30 and the fluid pressure exerted on a downstream larger circular major side surface 36 of the valve member 26, the valve member moves to the open position. The forces on the upstream side 34 of the valve member 26 will exceed the forces on the downstream side 36 when normal downstream demand for fluid causes the downstream pressure to drop (FIG. 3). The fluid then flows past a slanted minor side surface 38 and a cylindrical minor side surface 40 of the valve member 26. The fluid flow leaves the main section 21 of the valve chamber 20 through the circular downstream valve seat 22.

The fluid flows through a cylindrical base support section 42 (FIG. 2) of the chamber 20. The fluid flow from this chamber 42 enters a passage 44 in an outlet portion 46, of the plug body 19. The exterior of the outlet portion 46 is provided with annular barbs 48 which engage the conduit 16. To assure a fluid-tight fit with conduit 16, a ferrule 50 (FIG. 1) may also be used to further secure this connection.

In the event of a substantial reduction in downstream pressure and consequent excess flow such as might occur upon the rupture of the downstream conduit 16 (FIG. 1), the pressure force on the upstream side 34 of the valve member 26 increases. This causes it to move from the open position (FIG. 3) to a closed position abutting the downstream valve seat 22 (FIG. 4). When the valve member 26 is in this closed position, it blocks substantially all the fluid flow through the plug assembly. This prevents the loss of fluid and possible harm to operating personnel from a violent discharge of fluid into the atmosphere. The prevention of excess flow is especially important when the downstream conduit 16 (FIG. 1) is a flexible conduit, since the rupture of this type of conduit may be accompanied by rapid and erratic whipping motions of the broken conduit until the fluid flow is substantially reduced.

When the valve member 26 is in the closed position abutting the downstream valve seat 22, some fluid is still allowed to flow through a plurality of leakdown passages 52 and 54 (FIG. 4). The leakdown passages 52 and 54 shown in FIG. 2 extend between two circular major side surfaces 34 and 36 of the valve member 26 and are generally parallel to the longitudinal axis of the valve chamber 20. The leakdown passages are located radially inward of the valve seats 22 and 24 so that some fluid is permitted to flow regardless of which valve seat the valve member 26 is closed against.

When the cause of the reduction of downstream pressure has been eliminated, fluid flowing through the leakdown passages 52 and 54 enables the downstream pressure to build up. When the downstream pressure force acting on the major side surface 36 combined with the force of the biasing spring 30 slightly exceeds the upstream pressure force acting on the opposite major side surface 34, the valve member 26 returns to its closed position (see FIG. 2), abutting the upstream valve seat 24. When normal demand again causes the downstream pressure to drop, the valve member 26 will return to the intermediate position (FIG. 3).

The valve member 26 is held coaxial with the valve chamber 20 and valve seats 22 and 24 by a support member 28 (FIG. 2). The support member 28 is fixedly mounted to a support base or spider 56 in the section 42 of the valve chamber 20. The support member 28 extends through both valve seats 22 and 24. This enables the major side surface 34 and the larger major side surface 36 of the valve member 26 to abut the annular valve seats 22 and 24. A circular head 57 is provided on one end of the support member to limit axial movement of the valve member 26 before assembly.

The valve member 26 has a cylindrical central passage 58 through which the support member 28 extends. The passage 58 is coaxial with the valve member 26 and extends between the two major side surfaces 34 and 36 of the valve member. The passage 58 cooperates with the support member 28 to allow free sliding motion of the valve member 26 on the support member.

Figure 5:
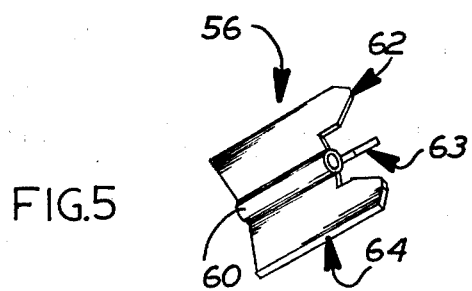
FIG. 5 is a pictorial illustration of a base for a valve member support rod.

The support base 56 includes a central cylinder body 60 (FIGS. 2 and 5) which is coaxial with the valve chamber 20 and a plurality of radially extending legs 62, 63 and 64. The body 60 has a central passage 66 which is adapted to receive the support member 28. During assembly the support member is pressed into the central passage 66 of the support base 56. The radially projecting legs 62, 63 and 64 cooperate with the interior walls 68 of the base support chamber 42 of the plug body 70 to hold the support base 56 and support member 28 fixedly in place. The biasing spring 30 is a coil spring and is coaxial with the support member 28. The downstream end 72 of the spring 30 abuts the support base 56 and its upstream end 74 abuts an annular recess 76 in the valve member 26. This recess 76 is coaxial with the central passage 58 through the valve member.

When the plug assembly 12 is removed from the quick-connect socket 14 (see FIG. 1) or when for any reason the upstream pressure is less than the downstream pressure, the valve member 26 is subject to unbalanced forces which move it to a closed position against the upstream valve seat 24 as shown in FIG. 2. Under these conditions the downstream pressure acting on circular major side surface 36 combined with the force of the biasing coil spring 30 exceeds the force exerted on the opposite or upstream circular major side surface 34, and the valve member 26 is thus subject to a net force in the upstream direction. Under the influence of this net upstream force, the valve member 26 slides on the support member 28 until it reaches a closed position abutting the upstream valve seat 24 (see FIG. 2). This prevents a backflow and protects personnel from the dangers of a rapid fluid discharge.

The continuing sliding motion of the valve member 26 on the support member 28 between the two valve seats 22 and 24 provides a self cleansing action. The motion of the sliding parts against one another keeps the moving surfaces free of any contaminants that might be present in the fluid supply. It is contemplated that this sliding action will occur between the first closed position (FIG. 2) and the open position (FIG. 3).

The upstream valve seat 24 is formed by the annular end of the leading end or nose portion 32. The exterior of the nose portion 32 has an annular groove 78 formed to cooperate with the coupling assembly 14 of FIG. 1. Additionally, the nose portion 32 has an annular ridge 80 which cooperates with a corresponding shoulder 82 in the plug body 70. During assembly the nose portion 32 is inserted into the plug body 19 until the ridge 80 and the shoulder 82 are in abutting engagement; then the end of the plug body is crimped over the ridge 80, as shown in FIG. 2. This permanently retains the nose portion 32 in the plug body 19 and provides a fluid-tight seal.

The plug assembly 12 thus operates to prevent excess flows by enabling the valve member 26 to slide along the support member 28 under the influence of a net pressure force acting in the downstream direction and against the influence of the biasing spring 30 acting in the upstream direction. By proper selection of the stiffness of the biasing spring 30 it is possible to regulate what pressure differential, and hence what flow rate, will cause the valve member 26 to slide into a closed position against the downstream valve seat 22.

In a similar fashion the valve member 26 slides into a closed position abutting the upstream valve seat 24 when the net force acting upon it is in the upstream direction (see FIG. 2). This net force consists of a pressure force acting on both major sides 34 and 36 of the valve member and the force of the spring 30. The pressure force acting on the upstream major side surface 34 may be either the force of a pressurized fluid if the socket 14 and plug assembly 12 are connected in fluid communication, or it may be atmospheric pressure if the plug assembly has been disconnected from the socket. Whatever the source of the pressure force on the upstream side 34 of the valve member 26, when it is less than the sum of the spring force and the downstream pressure force, both acting in the opposite direction, the valve member 26 moves against the upstream valve seat 24.

The valve member 26 will move to a position closed against the upstream valve seat 24 even when the upstream pressure is higher than the downstream pressure. This is because the force acting on the upstream side 34 of the valve member 26 is solely a pressure force, while the force on the downstream side 36 is the sum of the spring force and the pressure force. The valve thus operates to anticipate backflows and to prevent them. Again, proper selection of the stiffness of the biasing spring 30 can regulate the exact presssure differential which will trigger the backflow prevention.

When the valve member 26 is seated, the flow through the plug assembly 12 is substantially reduced. The leakdown passages 52 and 54 allow fluid to flow at a low rate until the pressure forces are balanced again. This low flow rate is desirable to prevent excess fluid loss and to prevent possible danger to operating personnel.

In a second embodiment of the present invention the plug assembly 12a (FIG. 6) has a threaded nose portion 32a adapted to be connected with a socket assembly 14a having cooperating threads 86. The threaded nose portion 32a of the second embodiment is adapted to make a fluid-tight seal with the socket assembly 14a to conduct fluid from conduit 18a supplying fluid through the plug assembly 12a, to conduit 16a. The nose portion 32a of the plug assembly 12a has external male threads 88 which cooperate with the internal threads 86 of the socket assembly 14a in a well known manner.

The general mode of operation of the second embodiment is the same as of the first embodiment. The plug assembly 12a provides a flow limiting feature which substantially reduces flow in the downstream direction if the flow becomes excessive. It also has a backcheck feature which assures that fluid cannot flow through the plug assembly from the normally downstream direction to the normally upstream direction.

The second preferred embodiment provides a unique body 19a for the plug assembly 12a (FIG. 7). The body 19a of the plug assembly 12a utilized in the second embodiment has downstream portion 90 identical to that used in first embodiment. It differs from the first embodiment upstream from the valve chamber. The cylindrical walls 92 of the valve chamber 21a continue straight and parallel. The length of the second embodiment plug body 19a is the same as the length of the finished second embodiment plug assembly (FIGS. 6 and 7).

A subassembly 94 including the valve member 26a, the support rod 28a, biasing spring 30a and the support base 56a is inserted into the open upstream end of the plug body 19a.

The subassembly 94 is in place when the radially projecting arms 62a of the support base 56a are in abutting engagement with the inside cylindrical sidewall 68a of the base support chamber 47a and when the upstream ends 98 of the support arms 62a are far enough downstream to be entirely within the base support chamber 42a. When these two conditions are met, the support base 56a will firmly support the member 28a and the upstream ends 98 of the radially projecting arms 62a will not interface with the seating of the valve member 26a against the downstream valve seat 22a.

Once the subassembly 94 is in place, the upstream end portion of the plug body 100 is swaged down to a smaller diameter. The swaging process results in a tapering inside surface 102 extending from the valve chamber 20a to the upstream valve seat 24a. The diameter at the downstream end of this tapering portion 102 is the same as the diameter of the valve chamber 20a so that there is a smooth transition between the valve chamber and the tapered portion.

The upstream, smaller end of the tapered portion 102 forms the upstream valve seat 24a. The diameter of the upstream end of the tapered section is smaller than the diameter of the downstream end, and it is also smaller than the diameter of the smaller, circular major side surface 34a of the valve member 26a. Thus when the valve member 26a abuts the upstream valve seat 24a, the circumference of the smaller circular major side surface 34a of the valve member 26a abuts the wall of the taper 102 to close off potential back flows.

Thus in the second preferred embodiment the design of the plug assembly 12a is the same as the first embodiment from the valve chamber downstream to the outlet portion 46a. Upstream of the valve chamber 20a a swaging process is used to form the plug body and upstream valve seat 24a. Rather than being the end surface of a separate piece 32 as it is in the first embodiment (FIG. 1) the upstream valve seat 24a in the second embodiment is formed by swaging the plug body 19a to form a tapered section 102 co-axial with the plug body's longitudinal axis. The tapered section 102 forms a smooth transition between the valve chamber 20a and the upstream valve seat 24a. Because the valve member 26a has an outside diameter larger than that of the upstream valve seat 24a, the valve member is permanently trapped in the valve chamber 20a. When the valve member 26a is abutting the upstream valve seat 24a, the circular edge 106 of the valve member 26a is in contact with the inside surface of the tapered portion 102.

Thus, the present invention provides a new and improved plug assembly 12 which is capable of preventing excessive fluid flow and back flows (FIG. 1). Under normal conditions, fluid pressure at the inlet or upstream side 31 of the plug assembly 12 forces a valve member 26 from a first closed position (FIG. 2) to an open position (FIG. 3) against the influence of a biasing spring 30. The fluid then flows freely through the plug assembly 12. Upon the occurrence of an excessively large pressure differential across the plug assembly 12 and the resulting initiation of excessive fluid flow, the valve member 26 is urged against the force of the biasing spring 30 to a second closed position in abutting engagement with the outlet valve seat 22 (FIG. 4).

When the valve member 26 is in this second closed position, it blocks substantially all flow through the plug assembly 12, and the only fluid flow is through leakdown passages 52 and 54 in the valve member. These leakdown passages are provided so that once the cause of the excess flow has been eliminated, the pressure differential across the closed plug assembly 12 will drop. The valve member 26 then returns to the closed position abutting the upstream valve seat 24 under the influence of the biasing spring 30 (FIG. 2). If downstream demand is normal, the valve member 26 will again move to its open position against the influence of the biasing spring (FIG. 3).

In the event that the pressure on the downstream side 36 of the valve member 26 should increase, or the pressure on the upstream side 34 should decrease, the valve member will be urged against an inlet valve seat 24 by a back flow pressure in cooperation with the biasing spring 30. The passages 52 and 54 through the valve member 26 provide a leakdown so that when operating conditions are again returned to normal, the pressure differential across the valve member will drop, and the valve member will automatically return to its open position (FIG. 3).

The following is claimed:

1. A plug assembly for use in association with a socket assembly to connect a pair of conduits in fluid communication with each other, said plug assembly comprising a plug body at least partially defining a valve chamber, said valve chamber having a first valve seat through which fluid normally flows into said valve chamber and a second valve seat through which fluid normally flows out of said valve chamber, said first valve seat being spaced apart from and extending generally parallel to said second valve seat, a longitudinally extending support member disposed in said valve chamber and fixedly connected with said plug body, a valve member slidably mounted on said support member and disposed in said valve chamber, said valve member being movable between a first closed position, an open position, and a second closed position, said valve member in said first closed position engaging said first valve seat and at least partially blocking fluid flow through said first valve seat, said valve member in said second closed position being spaced from said first valve seat and disposed in engagement with said second valve seat and at least partially blocking fluid flow through said second valve seat, and said valve member in said open position being disposed between and spaced apart from said first and said second valve seats to enable fluid to flow from said first valve seat around said valve member and through said second valve seat, spring means for urging said valve member toward said first closed position, said valve member being movable from said first closed position to said open position against the influence of said spring means, said valve member being movable from said open position to said second closed position against the influence of said spring means and under the influence of an excessive flow of fluid through said valve chamber to at least partially block the excessive flow of fluid, said valve member including first surface means for defining a passage extending axially through said valve member, said passage extending axially through said valve member from a first major side of said valve member to a second major side of said valve member at a location which is disposed inwardly of said first valve seat when said valve member is in said first closed position, said valve member further including second surface means defining a central passage extending through said valve member, said second surface means being disposed in sliding, abutting engagement with said support member and movable along said support member as said valve member moves between said first and second closed positions, said support member having an end portion extending through one of said valve seats to enable said valve member to move between said first and second closed positions and having a head connected with said end portion for limiting movement of said valve member relative to said support member during assembly of said plug assembly.

2. A plug assembly as set forth in claim 1 wherein said plug body includes an end portion which has been deformed radially inwardly by a swaging process to form said first valve seat.

3. A plug assembly as set forth in claim 1 wherein said support member includes an axially extending support rod having a central axis which is coincident with a central axis of the valve chamber and a base section having a plurality of radially extending support arms which engage an inner surface of said plug body to support said rod in said valve chamber.

4. A plug assembly as set forth in claim 3 wherein said spring means is a coil spring which circumscribes said support member and has a first end portion which is disposed in abutting engagement with a first major side of said valve member and a second portion which is disposed in abutting engagement with said base to urge said valve member toward said first valve seat and said head end portion of said support member.

5. A device as set forth in claim 1 wherein said slidably mounted valve member includes surface means for engaging said support member to dislodge foreign particles deposited by the fluid flow.

6. A plug assembly for use in association with a socket assembly to connect a pair of conduits in fluid communication with each other, said plug assembly comprising a plug body at least partially defining a valve chamber, said valve chamber having a first valve seat through which fluid normally flows into said valve chamber and a second valve seat through which fluid normally flows from said valve chamber, said first valve seat being spaced apart from and extending generally parallel to said second valve seat, a longitudinally extending support member disposed in said valve chamber and fixedly connected with said plug body, said support member extending through said first and second valve seats and including an axially extending support rod which extends through said first valve seat and has a central axis which is coincident with a central axis of the valve chamber and a base section having a plurality of radially extending support arms which engage an inner surface of said plug body to support said rod in said valve chamber, a valve member slidably mounted on said support rod and disposed in said valve chamber, said valve member being movable along said support rod between a first closed position, an open position, and a second closed position, said valve member in said first closed position engaging said first valve seat and at least partially blocking fluid flow through said first valve seat, said valve member in said second closed position being spaced from said first valve seat and disposed in engagement with said second valve seat and at least partially blocking fluid flow through said second valve seat, and said valve member in said open position being disposed between and spaced apart from said first and second valve seats to enable fluid to flow from said first valve seat through said second valve seat, spring means for urging said valve member toward said first closed position, said valve member being movable from said first closed position to said open position against the influence of said spring means to enable fluid to flow from said first valve seat to said second valve seat, said valve member being movable from said open position to said second closed position against the influence of said valve spring and under the influence of an excessive flow of fluid through said valve chamber to block at least partially the excessive flow of fluid, said spring means including a coil spring circumscribing said support rod and having a first end portion disposed in engagement with said valve member and a second end portion disposed in engagement with said base, said valve member including surface means for defining a passage extending through said valve member, said passage extending through said valve member from a first major side surface of said valve member to a second major side surface of said valve member at a location which is disposed inwardly of said first valve seat when said valve member is in said first closed position and is inwardly of said second valve seat when said valve member is in said second closed position.

7. A method of making a plug assembly having a plug body in which a valve member moves along a support rod between two axially spaced circular valve seats to limit excess flow in the normal downstream direction and to limit backflows in the normal upstream direction, said method including the steps of providing a plug body having one annular valve seat connecting a valve chamber with an outlet passage, positioning the valve member in the chamber on the support rod, deforming the plug body to form a second annular valve seat axially spaced apart from the first valve seat so as to enable the valve member to slide along the support rod between a first position abutting the first valve seat and a second position abutting the second valve seat, the valve member being continuously urged toward the second position by a spring and wherein the valve member is moveable from the second position to an open position intermediate the first and second positions enabling fluid to flow from the first valve seat around the valve member and through the second valve seat, the valve member further being moveable from the open position to the first position against the influence of the spring and under the influence of an excessive fluid flow to at least partially block an excess flow of fluid, said method further including the steps of providing the valve member with a passage extending axially through the valve member from a first major side surface to a second major side surface at a location which is disposed radially inwardly of the first valve seat when the valve member is in the first closed position and radially inwardly of said second valve seat when the valve member is in the second closed position, and providing the valve member with a central passage through the valve member, said step of positioning the valve member in the chamber including the step of locating the passage in sliding engagement with the support rod.

* * * * *